United States Patent
Cheng

(10) Patent No.: US 9,287,987 B2
(45) Date of Patent: Mar. 15, 2016

(54) SELF-SEEDED COLORLESS BURST-MODE TRANSMITTER USING REFLECTIVE SEMICONDUCTOR OPTICAL AMPLIFIER AND INJECTION LOCKED FABRY-PEROT LASER

(71) Applicant: Futurewei Technologies, Inc., Plano, TX (US)

(72) Inventor: Ning Cheng, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 61 days.

(21) Appl. No.: 13/691,758

(22) Filed: Dec. 1, 2012

(65) Prior Publication Data

US 2013/0142512 A1     Jun. 6, 2013

Related U.S. Application Data

(60) Provisional application No. 61/565,789, filed on Dec. 1, 2011.

(51) Int. Cl.
  *H04J 14/00*     (2006.01)
  *H04B 10/20*    (2006.01)
  *H04B 10/50*    (2013.01)
  *G02B 6/26*     (2006.01)

(52) U.S. Cl.
  CPC ............... *H04B 10/501* (2013.01); *G02B 6/26* (2013.01); *H04B 10/506* (2013.01)

(58) Field of Classification Search
  CPC ....... H04B 10/501; H04B 10/506; G02B 6/26

USPC .......................................... 398/58–64, 66–73
See application file for complete search history.

(56) References Cited

U.S. PATENT DOCUMENTS

| | | | | |
|---|---|---|---|---|
| 4,079,339 A | * | 3/1978 | Kobayashi et al. | 372/97 |
| 4,686,485 A | * | 8/1987 | Goldberg | H01S 5/4081 359/340 |
| 4,689,794 A | * | 8/1987 | Brosnan | 372/18 |
| 4,752,931 A | * | 6/1988 | Dutcher et al. | 372/18 |
| 4,879,723 A | * | 11/1989 | Dixon et al. | 372/21 |
| 5,097,478 A | * | 3/1992 | Verdiell et al. | 372/94 |

(Continued)

FOREIGN PATENT DOCUMENTS

| | | |
|---|---|---|
| DE | 102008052475 A1 | 4/2010 |
| EP | 2482472 A2 | 8/2012 |

(Continued)

OTHER PUBLICATIONS

Choi et al, A Low-Noise Broadband Light Source for a WDM-PON Based on Mutually Injected Fabry-Pérot Laser Diodes With RF Modulation, Dec. 2008, IEEE Photonics Tec. Let., pp. 2072-2074.*

(Continued)

*Primary Examiner* — Ken Vanderpuye
*Assistant Examiner* — Dibson Sanchez
(74) *Attorney, Agent, or Firm* — Conley Rose, P.C.; Grant Rodolph; Jonathan K. Polk

(57) ABSTRACT

An apparatus comprises an optical port; a first optical transmitter; a second optical transmitter; a partially reflective mirror positioned between the first optical transmitter, the second optical transmitter, and the optical port; and an optical rotator positioned between the partially reflective mirror and the first optical transmitter.

23 Claims, 8 Drawing Sheets

(56) References Cited

U.S. PATENT DOCUMENTS

| | | | | |
|---|---|---|---|---|
| 5,099,486 A * | 3/1992 | Acharekar et al. | | 372/32 |
| 5,136,598 A * | 8/1992 | Weller et al. | | 372/26 |
| 5,142,542 A * | 8/1992 | Dixon | | 372/22 |
| 5,305,334 A * | 4/1994 | Margalit et al. | | 372/32 |
| 5,307,366 A * | 4/1994 | Auffret et al. | | 372/96 |
| 5,555,121 A * | 9/1996 | Dupont | | H01S 5/4006 372/18 |
| 5,568,303 A * | 10/1996 | Liedenbaum et al. | | 398/182 |
| 5,974,060 A * | 10/1999 | Byren et al. | | 372/19 |
| 6,181,463 B1 * | 1/2001 | Galvanauskas et al. | | 359/330 |
| 6,359,913 B1 * | 3/2002 | Lodenkamper | | 372/18 |
| 6,661,814 B1 * | 12/2003 | Chapman et al. | | 372/6 |
| 6,704,469 B1 * | 3/2004 | Xie et al. | | 385/11 |
| 6,813,288 B2 * | 11/2004 | Kim et al. | | 372/20 |
| 7,106,974 B2 * | 9/2006 | Lee et al. | | 398/168 |
| 7,167,649 B2 * | 1/2007 | Song et al. | | 398/72 |
| 7,269,352 B2 * | 9/2007 | Jung et al. | | 398/79 |
| 7,313,157 B2 * | 12/2007 | Sorin et al. | | 372/50.1 |
| 7,379,669 B2 * | 5/2008 | Kim | | 398/74 |
| 7,391,794 B2 * | 6/2008 | Kane | | 372/10 |
| 7,599,413 B2 * | 10/2009 | Luo et al. | | 372/32 |
| 7,620,082 B2 * | 11/2009 | van der Veer | | 372/29.011 |
| 7,630,424 B2 * | 12/2009 | Ershov et al. | | 372/57 |
| 7,633,979 B2 * | 12/2009 | Luo et al. | | 372/21 |
| 7,680,416 B2 * | 3/2010 | Hann et al. | | 398/85 |
| 8,098,697 B2 * | 1/2012 | Dubreuil et al. | | 372/20 |
| 8,238,750 B2 * | 8/2012 | Rossetti et al. | | 398/79 |
| 8,290,370 B2 * | 10/2012 | Lee et al. | | 398/72 |
| 8,417,118 B2 * | 4/2013 | Bai | | 398/65 |
| 8,559,821 B2 * | 10/2013 | Wen et al. | | 398/79 |
| 8,606,107 B2 * | 12/2013 | Bai et al. | | 398/70 |
| 2001/0004290 A1 * | 6/2001 | Lee et al. | | 359/124 |
| 2003/0103534 A1 | 6/2003 | Braiman et al. | | |
| 2003/0141288 A1 * | 7/2003 | Mayer | | 219/121.73 |
| 2004/0228376 A1 * | 11/2004 | Dane et al. | | 372/32 |
| 2005/0036787 A1 * | 2/2005 | Lee et al. | | 398/72 |
| 2006/0140548 A1 * | 6/2006 | Shin et al. | | 385/89 |
| 2006/0215714 A1 * | 9/2006 | Luo et al. | | 372/29.02 |
| 2006/0263090 A1 * | 11/2006 | Lee et al. | | 398/79 |
| 2007/0091941 A1 * | 4/2007 | Mori | | H01S 3/06754 372/18 |
| 2008/0089369 A1 * | 4/2008 | Luo et al. | | 372/28 |
| 2008/0131127 A1 * | 6/2008 | Lee et al. | | 398/79 |
| 2008/0175592 A1 * | 7/2008 | Dai | | 398/87 |
| 2008/0279230 A1 * | 11/2008 | Dagenais | | 372/20 |
| 2008/0279557 A1 * | 11/2008 | Park et al. | | 398/79 |
| 2009/0059968 A1 * | 3/2009 | Luo et al. | | 372/18 |
| 2009/0074019 A1 * | 3/2009 | Wong et al. | | 372/26 |
| 2010/0150188 A1 * | 6/2010 | Lee et al. | | 372/26 |
| 2010/0202774 A1 * | 8/2010 | Yu | | 398/49 |
| 2010/0316378 A1 * | 12/2010 | Yeh et al. | | 398/58 |
| 2010/0316383 A1 * | 12/2010 | Kim et al. | | 398/79 |
| 2011/0076019 A1 * | 3/2011 | Rahn et al. | | 398/65 |
| 2011/0091210 A1 * | 4/2011 | Cheng | | H04J 3/1694 398/61 |
| 2011/0091214 A1 * | 4/2011 | Cheng | | 398/91 |
| 2011/0122912 A1 * | 5/2011 | Benjamin et al. | | 372/50.124 |
| 2011/0135309 A1 * | 6/2011 | Lee et al. | | 398/79 |
| 2011/0261454 A1 * | 10/2011 | Jiang et al. | | 359/484.03 |
| 2011/0261456 A1 | 10/2011 | Raab | | |
| 2011/0274436 A1 * | 11/2011 | McNicol et al. | | 398/140 |
| 2012/0093515 A1 * | 4/2012 | Lin et al. | | 398/79 |
| 2012/0269516 A1 * | 10/2012 | Liu et al. | | 398/72 |

FOREIGN PATENT DOCUMENTS

| | | |
|---|---|---|
| WO | 2011018054 A1 | 2/2011 |
| WO | 2011110126 A2 | 9/2011 |

OTHER PUBLICATIONS

Wong et al, Experimental study on extended reach TDM Hybrid and WDM PON configurations based on central office located raman pumps, Oct. 2009, IEEE, pp. 553-554.*

Foreign Communication From a Counterpart Application, PCT Application PCT/CN2012/067494, International Search Report, dated Feb. 21, 2013, 6 pages.

Foreign Communication From a Counterpart Application, PCT Application PCT/CN2012/067494, Written Opinion dated Feb. 21, 2013, 5 pages.

* cited by examiner

SELF-SEEDED COLORLESS BURST-MODE TRANSMITTER USING REFLECTIVE SEMICONDUCTOR OPTICAL AMPLIFIER AND INJECTION LOCKED FABRY-PEROT LASER

CROSS-REFERENCE TO RELATED APPLICATIONS

This application claims priority to U.S. Provisional Application No. 61/565,789 filed Dec. 1, 2011 by Ning Cheng titled "Self-seeded Colorless Burst Mode Transmitter Using Reflective Semiconductor Optical Amplifier and Injection Locked Fabry-Perot Laser," which is incorporated by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." A PON is a point-to-multipoint network comprised of an optical line terminal (OLT) at a central office, an optical distribution network (ODN), and a plurality of optical network units (ONUs) at the user premises. PONs may also comprise remote nodes (RNs) located between the OLTs and ONUs, for example, at the end of a road where multiple users reside. In recent years, time division multiplexing (TDM) passive optical networks (PONs), such as Gigabit PONS (GPONs) and Ethernet PONs (EPONs), have been deployed worldwide for multimedia applications. In TDM PONs, the total capacity is shared among multiple users using a time division multiple access (TDMA) scheme, so the average bandwidth for each user is limited to well below 100 megabits per second (Mbps) for GPONs and EPONs.

As user bandwidth demands have increased, ten gigabits per second (Gbps) (10 G) PONs (e.g., ten gigabit (XG)-PONs and 10 G EPONs) have also been standardized for next generation optical access. Wavelength division multiplexing (WDM) PONs are considered a very promising solution for future broadband access services. WDM PONs can provide high-speed links with dedicated bandwidth up to 10 G. In a WDM PON, each ONU is served by a dedicated wavelength channel to communicate with the central office or the OLT. However, the number of users who can be served by WDM PONs is typically limited to 64 or less due to limited wavelengths available for WDM PONs and a limited operation wavelength range for colorless ONUs. A hybrid approach combining TDM with WDM can support higher capacity so that an increased number of users can be served by a single OLT with sufficient bandwidth per user. TDM/WDM PONs present design and cost issues that must be addressed.

Previously, at least one TDM/WDM PON achieved colorless burst-mode transmission by employing a tunable optical transmitter as described in "40 Gbit/s λ-tunable stacked-WDM/TDM-PON using dynamic wavelength and bandwidth allocation," Hirotaka Nakamura, Optical Society of America, 2011, which is incorporated by reference as if reproduced in its entirety. Colorless transmission may mean that transmission is not limited to any particular wavelength. Burst-mode transmission may mean that transmission occurs in bursts of relatively short periods of duration. Burst-mode transmission may be necessary in a TDMA scheme. In the PON described by Nakamura, multiple wavelengths corresponding to an arrayed waveguide grating (AWG) channel shared a single feeder fiber using a WDM scheme, and each wavelength was further shared among multiple users using a TDMA scheme. A tunable optical transmitter at the ONU provided the colorless transmission, but tunable lasers at ONUs may create cost concerns.

Alternatively, at least two TDM/WDM PONs achieved colorless burst-mode transmission by employing a seeded optical transmitter as described in "Demonstration and Field Trial of a Scalable Resilient Hybrid ngPON," J. Prat, Optical Society of America, 2011 and "Dense WDM-PON based on Wavelength Locked Fabry-Perot Lasers," Sang-Mook Lee, Optical Society of America, 2005, which are incorporated by reference as if reproduced in their entirety. The PONs described by Prat and Lee were essentially the same as the PON described by Nakamura, but employed a seeded optical transmitter instead of a tunable optical transmitter. A high-power broadband light source at the central office was necessary to provide a seed light, but high-power broadband light sources at central offices may provide cost and upstream performance concerns, namely Rayleigh backscattering from the seed light.

At least one WDM PON achieved colorless transmission by employing a self-seeded reflective semiconductor optical amplifier (RSOA) transmitter as described in "Stable self-seeding of R-SOAs for WDM-PONs," Marco Presi, Optical Society of America, 2011, which is incorporated by reference as if reproduced in its entirety. In the PON described by Presi, multiple wavelengths corresponding to an AWG channel shared a single feeder fiber using a WDM scheme. Amplified spontaneous emission (ASE) noise from the RSOA transmitter was filtered by an AWG, reflected back by a Faraday rotator mirror (FRM), and seeded into the RSOA, thus providing colorless transmission. The use of a WDM scheme, but not an accompanying TDMA scheme, may not take full advantage of potential bandwidth because the dedicated bandwidth is wasted when user has no data to send.

SUMMARY

In one embodiment, the disclosure includes an optical transmitter comprising an optical port, a first optical transmitter, a second optical transmitter, a partially reflective mirror positioned between the first optical transmitter, the second optical transmitter, and the optical port, and an optical rotator positioned between the partially reflective mirror and the first optical transmitter.

In another embodiment, the disclosure includes an optical transmitter comprising a first optical transmitter configured to transmit a first light, wherein the first light has a wavelength and is oriented with a reference polarization, an optical rotator configured to rotate the first light to produce a rotated light having a rotated polarization, a second optical transmitter configured to transmit a second light, wherein the second light is a modulated burst or continuous mode light at the wavelength, and wherein the second light is oriented about 90 degrees with respect to the rotated light, and a fiber or waveguide configured to carry the rotated light and the second light.

In yet another embodiment, the disclosure includes a method comprising transmitting a first light, wherein the first light has a wavelength and is oriented with a reference polarization, rotating the first light to produce a rotated light having a rotated polarization, transmitting a second light, wherein the second light is a modulated burst-mode light at the wavelength, and wherein the second light is oriented about 90 degrees with respect to the rotated light, and combining the rotated light and the second light onto a single fiber.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A WDM PON may be overlaid on top of a TDMA system. In other words, multiple wavelengths may be multiplexed together to share a single feeder fiber, and each wavelength may be shared by multiple users using a TDMA scheme. Because each wavelength may be shared by multiple users using a TDMA scheme, burst-mode transmission is necessary in the upstream direction. Upstream may refer to the direction from the ONU to the central office. At least one TDM/WDM PON employed a self-seeded RSOA at the ONU in as described in "20 Gb/s hybrid TDM/WDM PONs with 512-Split using self-seeded reflective semiconductor optical amplifiers," by Ning Cheng, et al, in Proceedings of OFC/NFOEC, paper NTu2F, 2012, which is incorporated by reference as if reproduced in its entirety. Assuming a drop fiber length of 5 kilometers (km), a self-seeded RSOA at an ONU may have a relatively long turn-on delay of more than 100 microseconds (µs) because the optical power may not sufficiently build up enough until multiple round trips between the RSOA and the FRM due to the long cavity of the self-seeded RSOA. Accordingly, long bursts of 100 is to 1 millisecond (ms) may be necessary to achieve upstream transmission efficiency. Long upstream bursts may be implemented by concatenating multiple transmission frames, but the long upstream bursts may cause longer packet delays, may cause larger packet delay variations, and may not comply with current TDM PON standards (e.g., GPON, EPON, XG-PON, and 10 G EPON).

Disclosed herein are systems and methods for improving the operation of an optical transmitter in an optical network. The optical transmitter system may be suitable for a hybrid TDM/WDM PON. The optical transmitter may comprise two optical transmitters. The first optical transmitter may be a self-seeded optical transmitter for providing a continuous wave light for a second optical transmitter to lock onto. The second optical transmitter may comprise a short cavity conducive to a short turn-on delay and thus burst-mode transmission necessary for a TDMA scheme. The words "laser," "light," and "optical," as well as those words' derivations, may be interpreted to have the same meaning. Data may be encoded into or decoded from laser, light, and optical communications.

Figure 1:
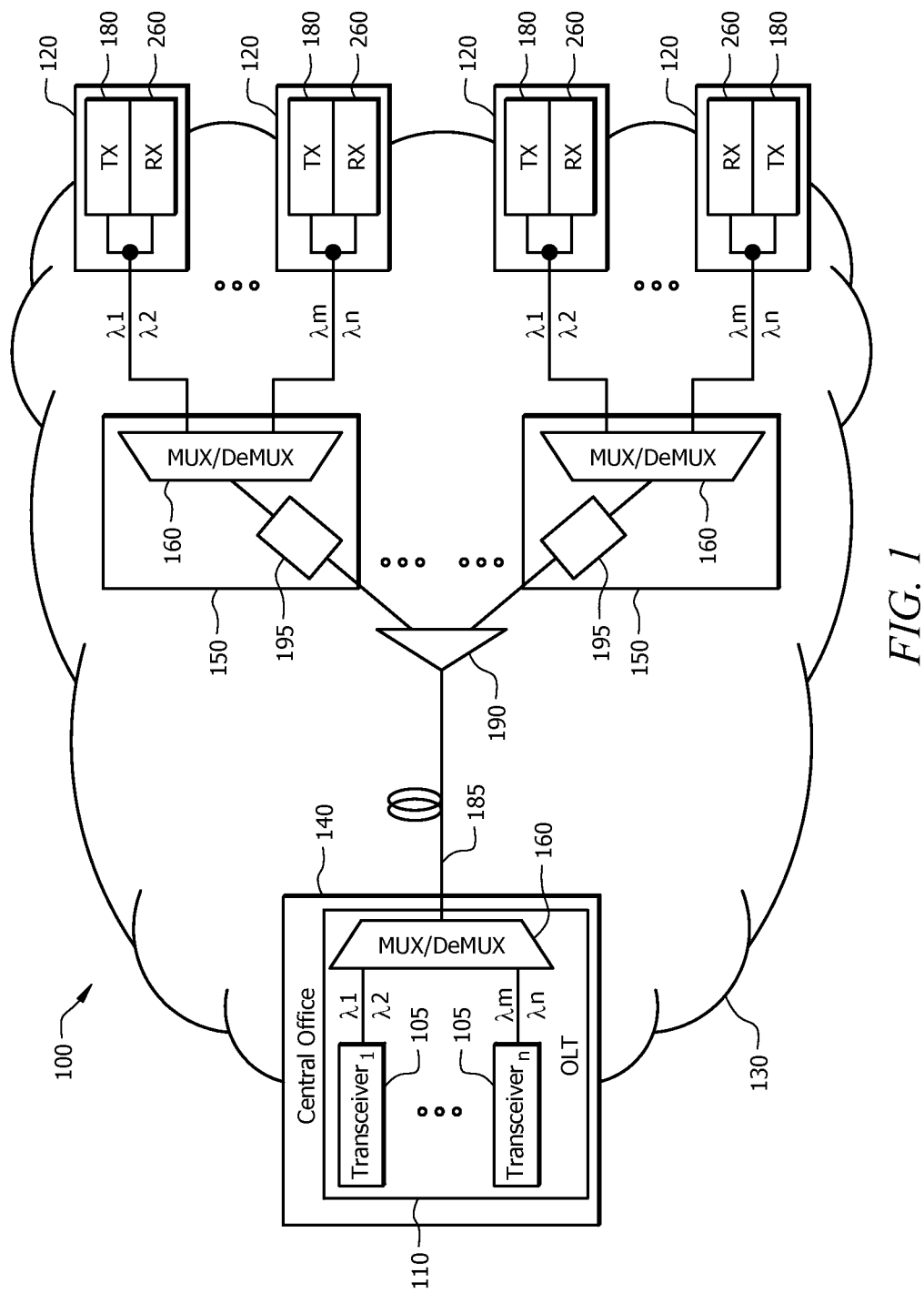
FIG. 1 is a schematic diagram of a TDM/WDM PON.

FIG. 1 is a schematic diagram of a TDM/WDM PON 100. The PON 100 may comprise an OLT 110 located in a central office 140, a plurality of ONUs 120 located at the customer premises, and an ODN 130 that couples the OLTs 110 the ONUs 120. The PON 100 may provide WDM capability by associating a downstream wavelength and an upstream wavelength with each transceiver 105 in the OLT 110 so that a plurality of wavelengths are present, combining those wavelengths into a single optical fiber cable 185, and distributing the plurality of wavelengths to a subset of the ONUs 120 through remote nodes (RNs) 150. The PON 100 may provide TDMA capability for each subset of ONUs 120 associated with an OLT 120.

The PON 100 may be a communications network that does not require any active components to distribute data among the OLT 110, RNs 150, and ONUs 120. Instead, the PON 100 may use the passive optical components in the ODN 130 to distribute data among the OLTs 110, RNs 150, and ONUs 120. The PON 100 may be a Next Generation Access (NGA) system, such as a ten Gbps GPON (XGPON), which may have a downstream bandwidth of about ten Gbps and an upstream bandwidth of about 2.5 Gbps. Alternatively, the PON 100 may be any Ethernet based network, such as an EPON defined by the Institute of Electrical and Electronics Engineers (IEEE) 802.3ah standard, a 10 Gigabit EPON as defined by the IEEE 802.3av standard, an asynchronous transfer mode PON (APON), a broadband PON (BPON) defined by the International Telecommunications Union (ITU) Telecommunications Standardization Sector (ITU-T) G.983 standard, a GPON defined by the ITU-T G.984 standard, a wavelength division multiplexed (WDM) PON (WPON), or a suitable after-arising technology, all of which are incorporated by reference as if reproduced in their entirety.

The central office 140 may be a physical building and may comprise servers and other backbone equipment (not shown) designed to service a geographical area with data transfer capability. The central office 140 may comprise a plurality of transceivers 105 and at least one multiplexer/demultiplexer (MUX/DeMUX) 160. The MUX/DeMUX 160 may be any suitable wavelength separator/combiner such as an AWG. The MUX/DeMUX 160 at the central office 140 may combine the various wavelengths from the transceivers 105 into a single line to feed into the RNs 160.

The OLT 110 may be any devices configured to communicate with the ONUs 120 and another network (not shown). Specifically, the OLT 110 may act as an intermediary between the other network and the ONUs 120. For instance, the OLT 110 may forward data received from the network to the ONUs 120, and forward data received from the ONUs 120 to the other network. Although the specific configuration of the OLT 110 may vary depending on the type of PON 100, in an embodiment, the OLT 110 may comprise a transmitter and a receiver. When the other network uses a network protocol, such as Ethernet or Synchronous Optical Networking/Synchronous Digital Hierarchy (SONET/SDH), which differs from the PON protocol used in the PON 100, the OLT 110 may comprise a converter that converts the network protocol into the PON protocol. The OLT 110 converters may also convert the PON protocol into the network protocol. The OLT 110 may be typically located at a central location, such as the central office 140, but may be located at other locations as well.

The ODN 130 may be a data distribution system, which may comprise optical fiber cables 185, couplers, splitters, distributors, and/or other equipment. In an embodiment, the optical fiber cables 185, couplers, splitters, distributors, and/or other equipment may be passive optical components. Specifically, the optical fiber cables 185, couplers, splitters, distributors, and/or other equipment may be components that do not require any power to distribute data signals between the OLTs 110 and the ONUs 120. Alternatively, the ODN 130 may comprise one or a plurality of active components, such as optical amplifiers and/or power splitters 190. The ODN 130 may typically extend from the OLTs 110 to the ONUs 120 in a branching configuration as shown in FIG. 1, but may be alternatively configured in any other point-to-multipoint configuration.

The RNs 150 may be any component positioned within the ODN 130 that provides partial reflectivity, polarization rotation, and/or WDM capability. For example, the RNs 150 may comprise a MUX/DeMUX 160 and a rotator mirror 195. The MUX/DeMUX 160 may be any suitable wavelength separator/combiner such as an AWG. The rotator mirrors 195 may be any device, such as a Faraday rotator and a partial reflective mirror, configured to rotate the polarization of light and/or reflect light. The rotator mirrors 195 may comprise a partially reflective component, such as a partially reflective mirror or a splitter and a fully reflective mirror. Other suitable optical rotators and reflectors may be used instead of the rotator mirrors 195. The RNs 150 may exist closer to the ONUs 120 than to the central office 140, for example, at the end of a road where multiple users reside, but the RNs 150 may also exist at any point in the ODN 130 between the ONUs 120 and the central office 140.

The ONUs 120 may be any devices that are configured to communicate with the OLT 110 and a customer or user (not shown). Specifically, the ONUs 120 may act as an intermediary between the OLT 110 and the customer. For instance, the ONUs 120 may forward data received from the OLT 110 to the customer and forward data received from the customer to the OLT 110 via the RNs 150. Although the specific configuration of the ONUs 120 may vary depending on the type of PON 100, the ONUs 120 may comprise an optical transmitter (e.g. laser 180) configured to send optical signals to the OLTs 110 and an optical receiver 260 configured to receive optical signals from the OLTs 110. Additionally, the ONUs 120 may comprise a converter that converts the optical signal into electrical signals for the customer, such as signals in the Ethernet or asynchronous transfer mode (ATM) protocol, and a second transmitter and/or receiver that may send and/or receive the electrical signals to a customer device. In some embodiments, ONUs 120 and optical network terminals (ONTs) are similar, and thus the terms are used interchangeably herein. The ONUs 120 may be typically located at distributed locations such as the customer premises, but may be located at other locations as well.

Figure 2:
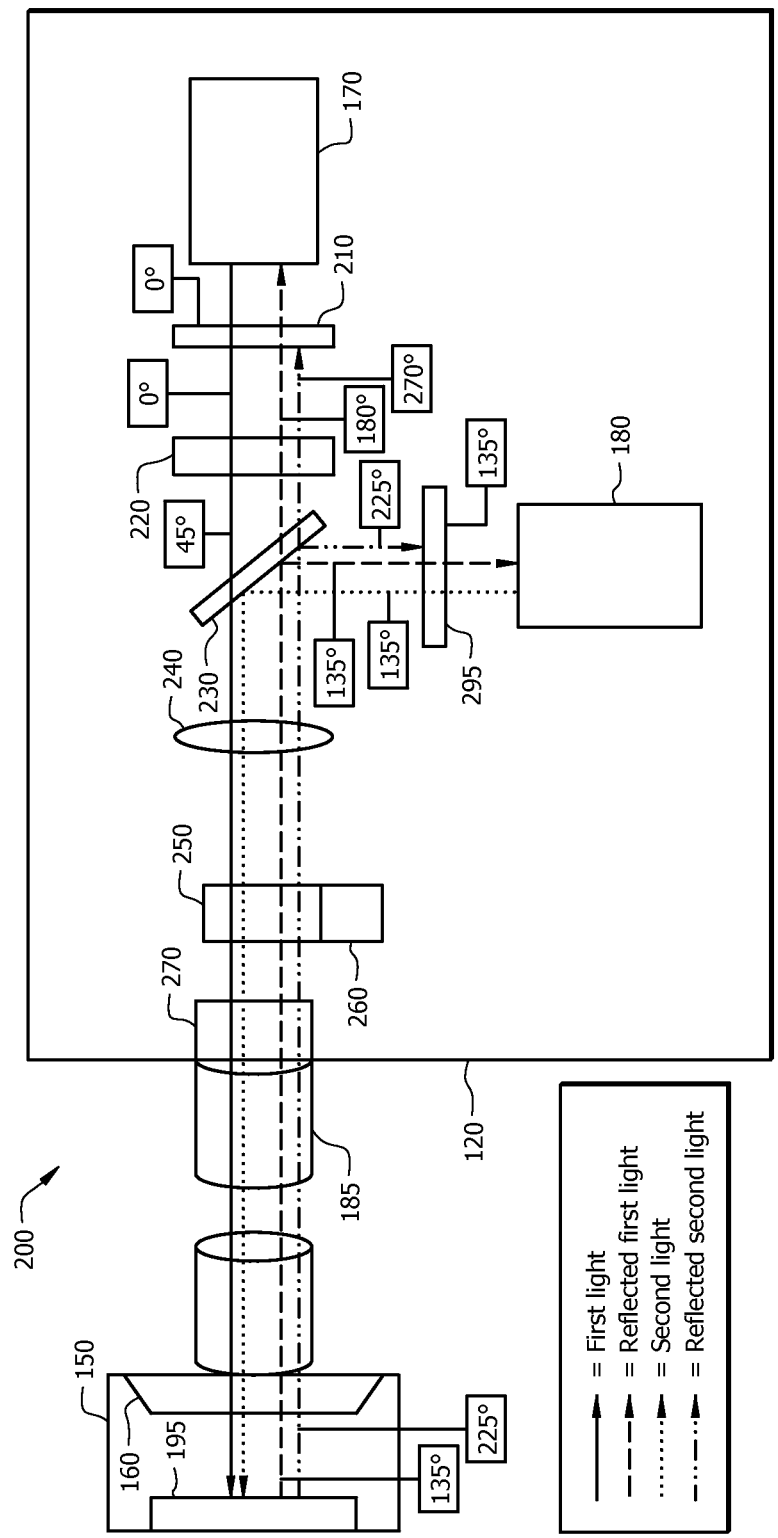
FIG. 2 is a schematic diagram of an exploded portion of the TDM/WDM PON in FIG. 1.

FIG. 2 is a schematic diagram of an exploded portion 200 of the TDM/WDM PON 100 in FIG. 1. The exploded portion 200 may comprise the RN 150 and the ONU 120, which may be coupled by the optical fiber cable 185. The ONU 120 may further comprise an optical amplifier (or laser) 170, the laser (or optical amplifier) 180, a first polarizer 210, a second polarizer 295, a rotator 220, a partially reflective mirror 230, a coupling lens 240, a diplexer 250, the receiver 260, and an optical port 270 arranged as shown in FIG. 2. The optical amplifier (or laser) 170 may be an RSOA, FP laser, or other suitable laser, and the laser (or optical amplifier) 180 may by an IL FP, IL RSOA, or other IL suitable laser. The optical amplifier 170 and the laser 180 may or may not be self-seeded. The first polarizer 210 may filter light so that it passes light with a polarization of 0° with respect to the optical amplifier 170 orientation and blocks light at other polarizations. The second polarizer 295 may filter light so that it passes light with a polarization of 135° with respect to the first polarizer 210 and blocks light at other polarizations. The rotator 220 may rotate the polarization of light by 45°. The rotator 220 may be a Faraday rotator or other suitable optical rotator. The partially reflective mirror 230 may split any reflected light (e.g. from RN 150) between the optical amplifier 170 and the laser 180. The coupling lens 240 may cause light to converge into a more focused beam suitable for entry into the optical fiber cable 185, and/or the optical port 270. The diplexer 250 may split downstream light (from the OLT) to the receiver 260 and pass through the upstream light from the optical amplifier 170 and the laser 180. The diplexer 250 may be an optical splitter and a wavelength blocking filter, or other suitable optical component. The receiver 260 may be a photodiode or other suitable optical component configured to receive light originating from its associated OLT. The optical port 270 may allow light to pass from the diplexer 250 to the optical fiber cable 185 and allow light to pass from the optical fiber cable 185 to the diplexer 250.

The optical amplifier 170 may turn on and emit an unmodulated first light towards the RN 150. The first light may pass through the first polarizer 210, which may polarize the first light at 0° with respect to the optical amplifier 170. The first light may then pass through the rotator 220 causing the polarization of the first light to rotate to 45°. The first light may then pass through the partially reflective mirror 230, coupling lens 240, diplexer 250, and optical port 270. The first light may move about via free space optics within the ONU 120 up until the point of entering and exiting the optical port 270; alternatively, optical fiber cables and/or waveguides may be used in the ONU 120.

After exiting the optical port 270 and the ONU 120, the first light may enter the optical fiber cable 185 and continue toward the RN 150. At the RN 150, the first light may pass through the MUX/DeMUX 160, which may combine the first light with wavelengths associated with the other ONUs 120 (as shown in FIG. 1). The first light may then pass through the rotator mirror 195. As described above, the rotator mirror 195 may rotate the polarization of the first light and reflect a portion of the first light back to the ONU 120. If the rotator mirror 195 rotates the first light 45°, reflects the first light with the mirror, and rotates the reflected first light another 45°, then the reflected first light will have been rotated a total of 90° and will have a polarization of 135°.

The reflected first light may pass back through the MUX/DeMUX 160, which may separate the reflected light intended for the ONU 120 from other reflected lights and from downstream transmissions from the central office 140 intended for other ONUs 120. The reflected first light may then pass back through the optical fiber cable 185, the optical port 270, the diplexer 250, the coupling lens 240, and the partially reflective mirror 230. The partially reflective mirror 230 may direct a portion of the reflected first light back to the optical amplifier 170 and a portion of the reflected first light to the laser 180.

On the path back to the optical amplifier 170, the reflected first light may pass through the rotator 220, which may cause the polarization of the reflected first light to rotate to 180°, which is parallel to the 0° orientation of the first polarizer 210 and the optical amplifier 170. As a result, the reflected first light may return through the first polarizer 210 and re-enter the optical amplifier 170, thus providing a seed light for the optical amplifier 170. In that respect, the optical amplifier 170 may function as a self-seeded optical oscillator. While the optical amplifier 170 remains on, the first light may oscillate back and forth as described above, thus providing a continuous wave light source whose wavelength is aligned with the corresponding channel of the MUX/DeMUX 160.

On the path to the laser 180, the reflected first light may remain at a 135° polarization, which is parallel to the 135° orientation of the second polarizer 295. As a result, the reflected first light may pass through the second polarizer 295 and enter the laser 180. The reflected first light may therefore provide a reference wavelength and polarization on to which the laser 180 may lock. It is well-known that external optical injection can improve the bandwidth and reduce the chirp of the laser 180, as described in "Enhanced Modulation Characteristics of Optical Injection-Locked Lasers: A tutorial," by E. K. Lau, et al, in IEEE Journal of Selected Topics in Quantum Electronics, vol. 15, no. 3, pp. 618-633, 2009.

The laser 180 may emit a modulated second light. The second light wavelength aligns with the corresponding channel of the MUX/DeMUX 160 because of the optical injection from the first light. The second light may pass through the second polarizer 295, which may polarize the second light at 135° with respect to the first polarizer 210 if the second light is not already polarized to 135°. The second light polarized to 135° may not interfere with the reflected first light polarized to 135° because the two lights travel in opposite directions. The second light may then be reflected by the partially reflective mirror 230 to the coupling lens 240, the diplexer 250, and the optical port 270. The second light may move about via free space optics within the ONU 120 up until the point of entering and exiting the optical port 270; alternatively, optical fiber cables and/or waveguides may be used in the ONU 120.

After exiting the optical port 270 and the ONU 120, the second light may enter the optical fiber cable 185 and continue to the RN 150. At the RN 150, the second light may pass through the MUX/DeMUX 160, which may combine the second light with transmissions associated with the other ONUs 120 shown in FIG. 1. The second light may then pass through the rotator mirror 195. As described above, the rotator mirror 195 may rotate the polarization of the second light and reflect a portion of the second light back to the ONU 120. If the rotator mirror 195 rotates the second light 45°, reflects the second light with the mirror, and rotates the reflected second light another 45°, then the reflected second light will have been rotated a total of 90° and will have a polarization of 225°. A large reflection coefficient related to the rotator mirror 195 may degrade transmissions from the laser 180 to the OLT, so the reflection coefficient, which may depend on the drop fiber length, may need to be optimized. A first portion of the second light may continue through the RN 150 and travel towards the central office 140, thus providing a modulated light to the central office 140.

Similar to the reflected first light, the reflected second light may then pass back through the MUX/DeMUX 160, the optical fiber cable 185, the optical port 270, the diplexer 250, the focusing lens 240, and the partially reflective mirror 230. The partially reflective mirror 230 may direct a portion of the reflected second light to the optical amplifier 170 and a portion of the reflected second light back to the laser 180.

On the path to the optical amplifier 170, the reflected second light may pass through the rotator 220, which may cause the polarization of the reflected second light to rotate to 270°, which is perpendicular to the 0° orientation of the first polarizer 210. As a result, the first polarizer 210 may block the reflected second light from entering the optical amplifier 170.

On the path back to the laser 180, the reflected second light may remain at a 225° polarization, which is perpendicular to the 135° orientation of the second polarizer 295. As a result, the second polarizer 295 may block the reflected second light from re-entering the laser 180.

Due to a short cavity, the laser 180 may have negligible turn-on and turn-off delays (compared to the bit period), which may make the laser 180 particularly suitable for burst-mode upstream transmissions. A comparison of the turn-on and turn-off delays of the ONU 120 and prior art systems is described below.

Several alternative configurations of the ONU 120 are possible. If the second polarizer 295 were not present, then the reflected second light may inject into the laser 180, introducing a pattern effect in the upstream transmissions. Such an effect can be avoided by transmitting the second light with a substantially smaller extinction ratio. Furthermore, a data pattern carried by the second light may interfere with the optical amplifier 170, so the optical amplifier 170 may operate in deep saturation in order to reduce the data pattern effect. Moreover, the polarization angles described may be understood to be approximate angles and may vary based on ODN 130, environmental, and other conditions.

Figure 3:
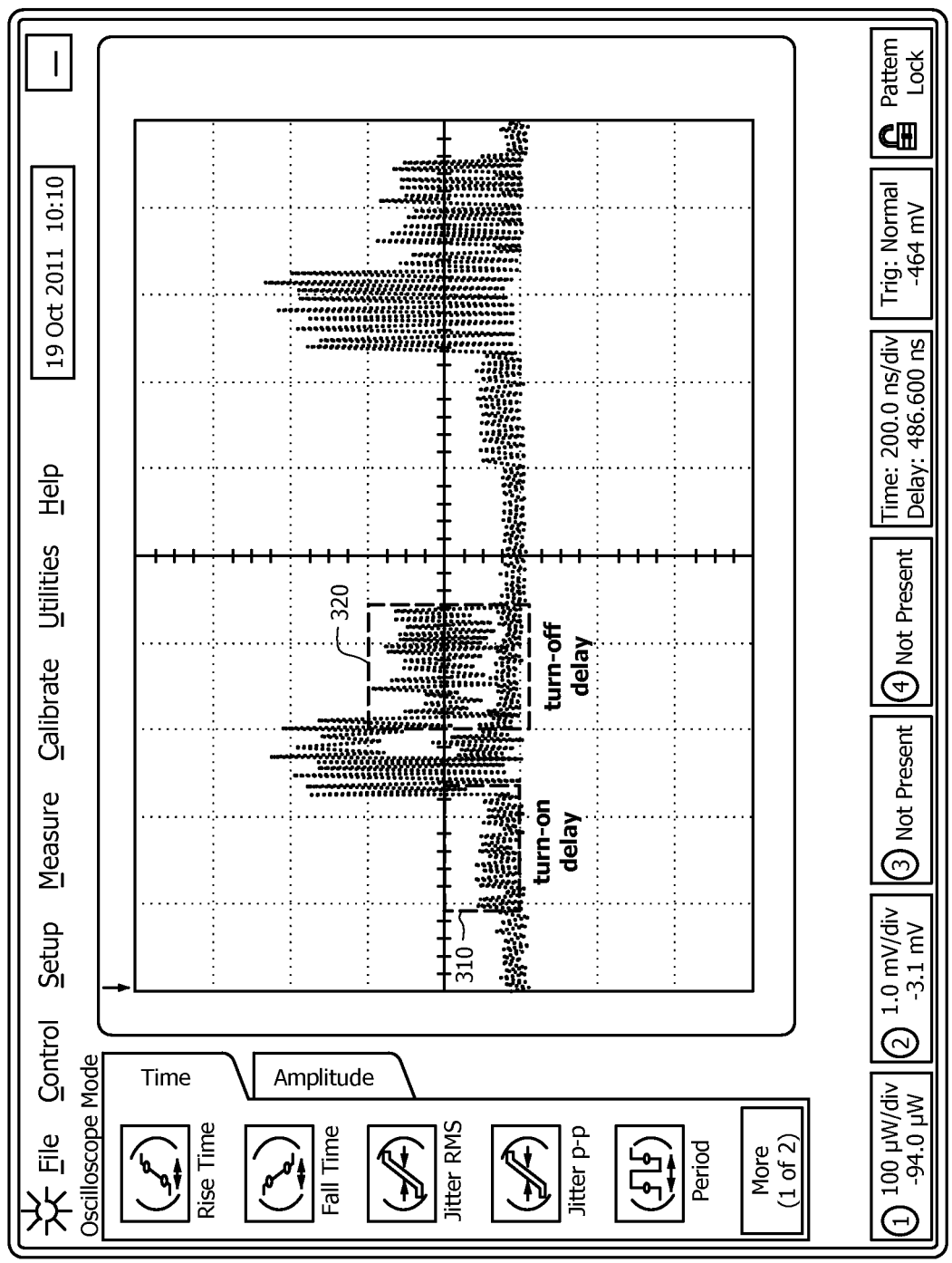
FIG. 3 is a graph of signals observed in a TDM/WDM PON transmitter with a single self-seeded reflective semiconductor optical amplifier (RSOA).

FIG. 3 is a graph 300 of signals observed in a TDM/WDM PON transmitter with a single self-seeded RSOA, for example, such as that described in Presi, supra. The x-axis may represent time divided into 200-nanosecond (ns) divisions, and the y-axis may represent transmission power divided into 100-microwatt (μW) divisions. As described above, due to the long cavity of the self-seeded RSOA, the optical power may not sufficiently build up enough until multiple round trips between the RSOA and an FRM. Accordingly, transmissions may have a long turn-on delay 310 and a long turn-off delay 320 as shown.

Figure 4:
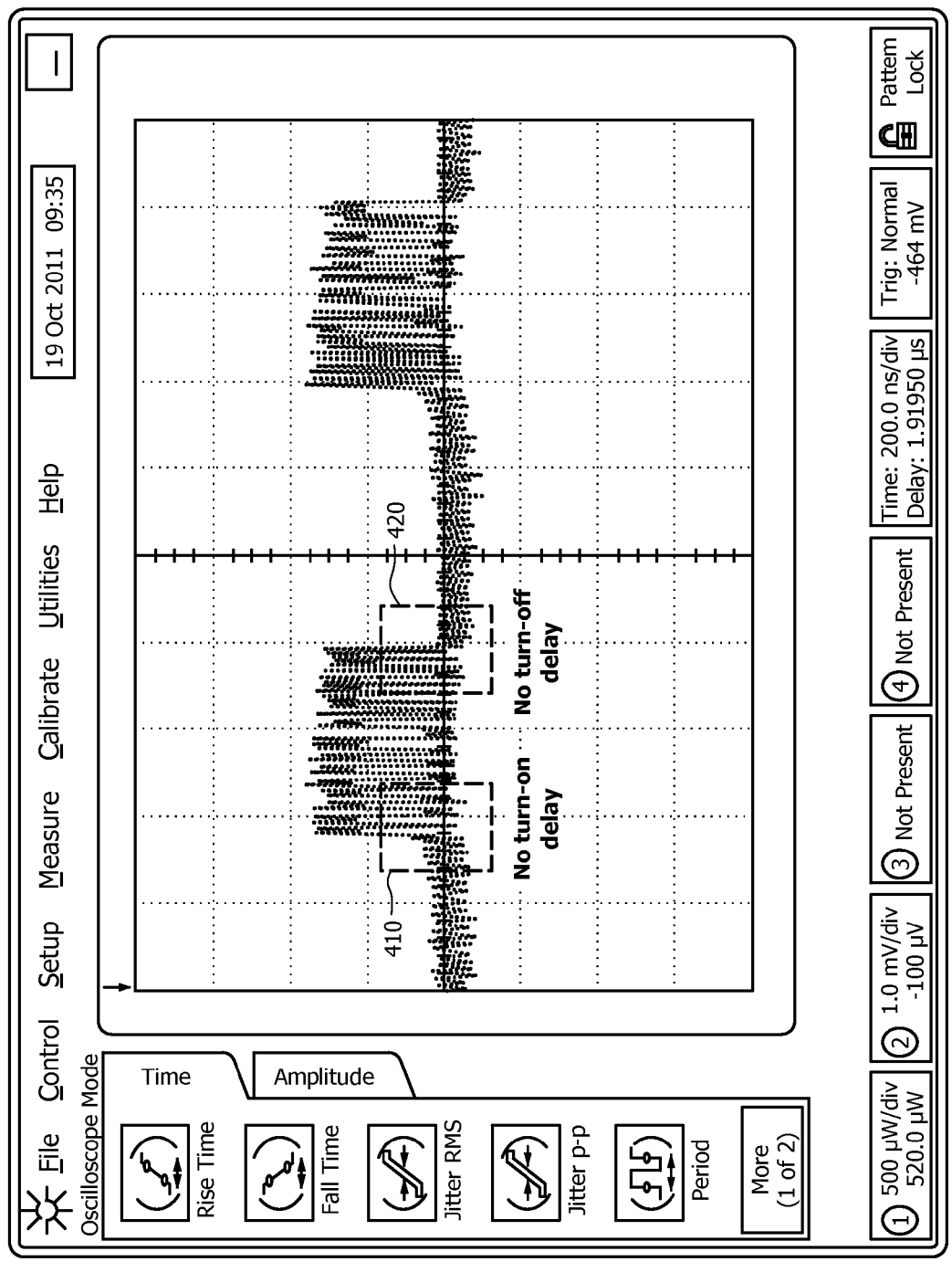
FIG. 4 is a graph of signals observed in a TDM/WDM PON transmitter with a self-seeded RSOA and an injection-locked Fabry-Perot (IL FP) laser.

FIG. 4 is a graph 400 of signals observed in a TDM/WDM PON transmitter with a self-seeded RSOA and an IL FP laser, for example, the ONU 120. The x-axis may represent time divided into 200-ns divisions, and the y-axis may represent transmission power divided into 500-μW divisions. Instead of the long turn-on delay 310 and the long turn-off delay 320 shown in FIG. 3, a turn-on delay 410 and a turn-off delay 420 for the IL FP light may be negligible as shown due to the short cavity of the IL FP laser.

Figure 5:
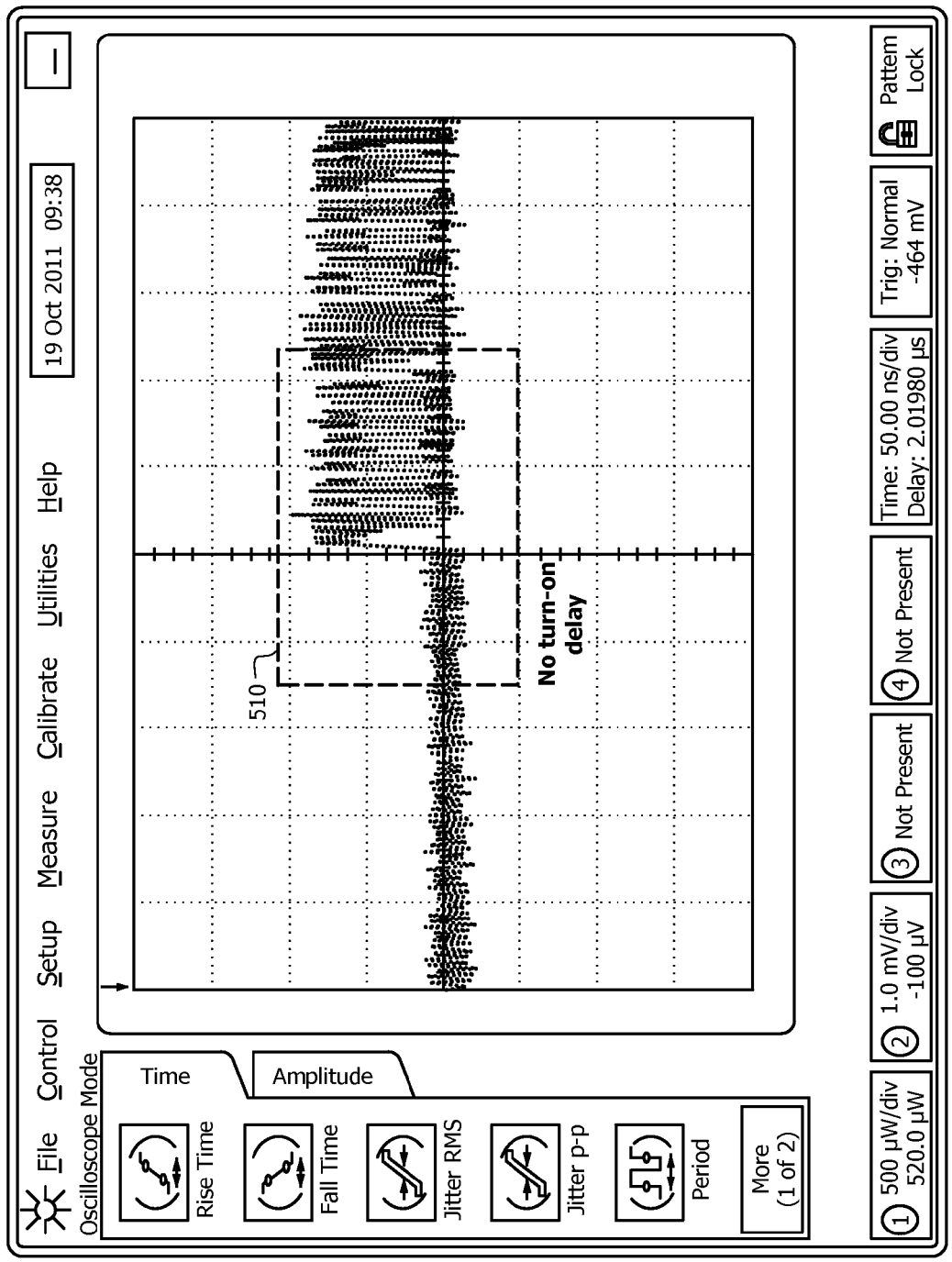
FIG. 5 is another graph of signals observed in a TDM/WDM PON transmitter with a self-seeded RSOA and an IL FP laser.

FIG. 5 is another graph 500 of signals observed in a TDM/WDM PON transmitter with a self-seeded RSOA and an IL FP laser, for example, the ONU 120. The x-axis may represent time divided into 50-ns divisions, and the y-axis may represent transmission power divided into 500-µW divisions. Once again, a turn-on delay 510 for the IL FP light may be negligible as shown.

Figure 6:
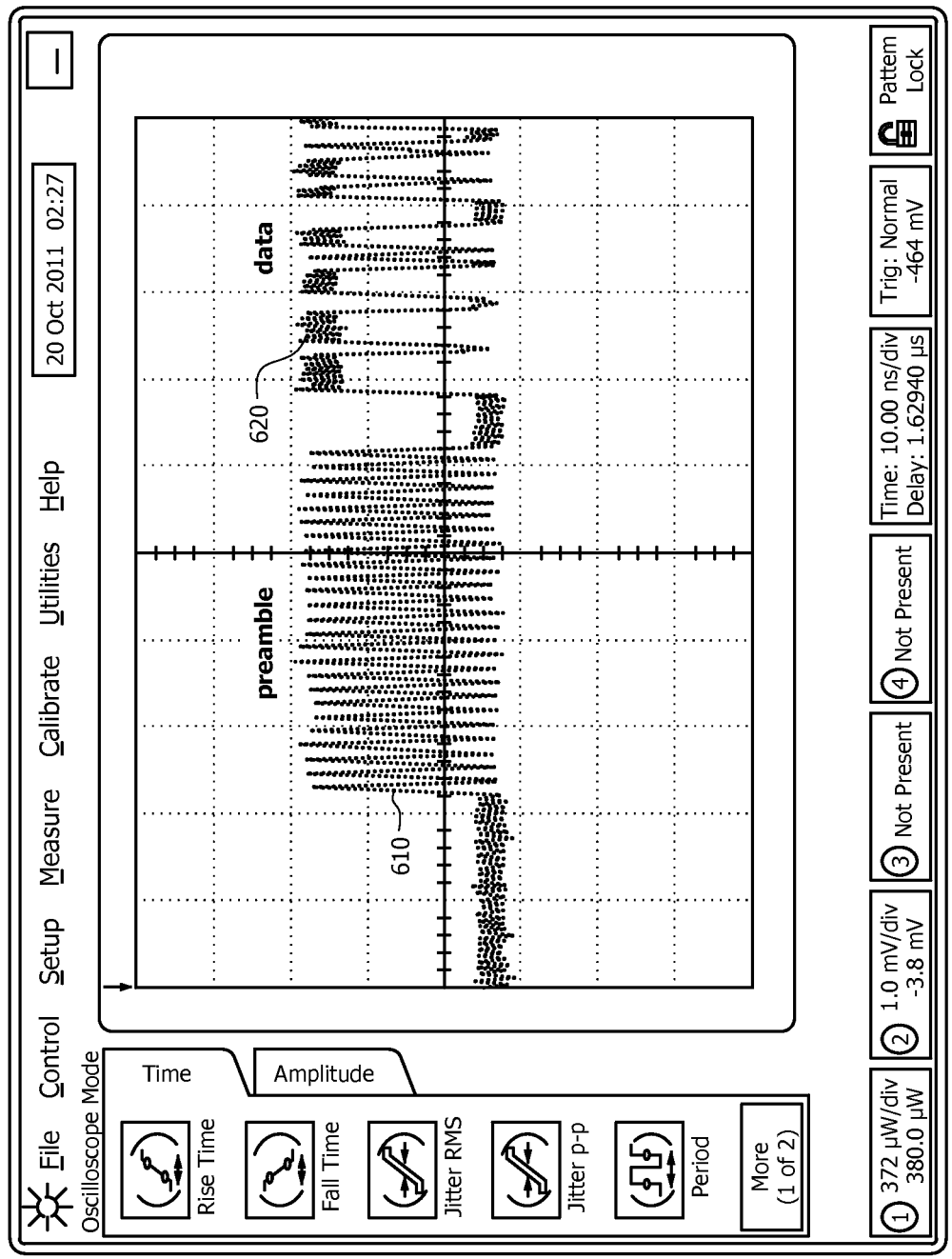
FIG. 6 is another graph of signals observed in a TDM/WDM PON transmitter with a self-seeded RSOA and an IL FP laser.

FIG. 6 is another graph 600 of signals observed in a hybrid TDM/WDM PON transmitter with a self-seeded RSOA and an IL FP laser, for example, the ONU 120. The x-axis may represent time divided into 10-ns divisions, and the y-axis may represent transmission power divided into 372-µW divisions. The graph 600 shows both a preamble 610 and payload data 620 from the IL FP light are clearly distinguishable with negligible turn-on and turn-off delays as shown.

Figure 7:
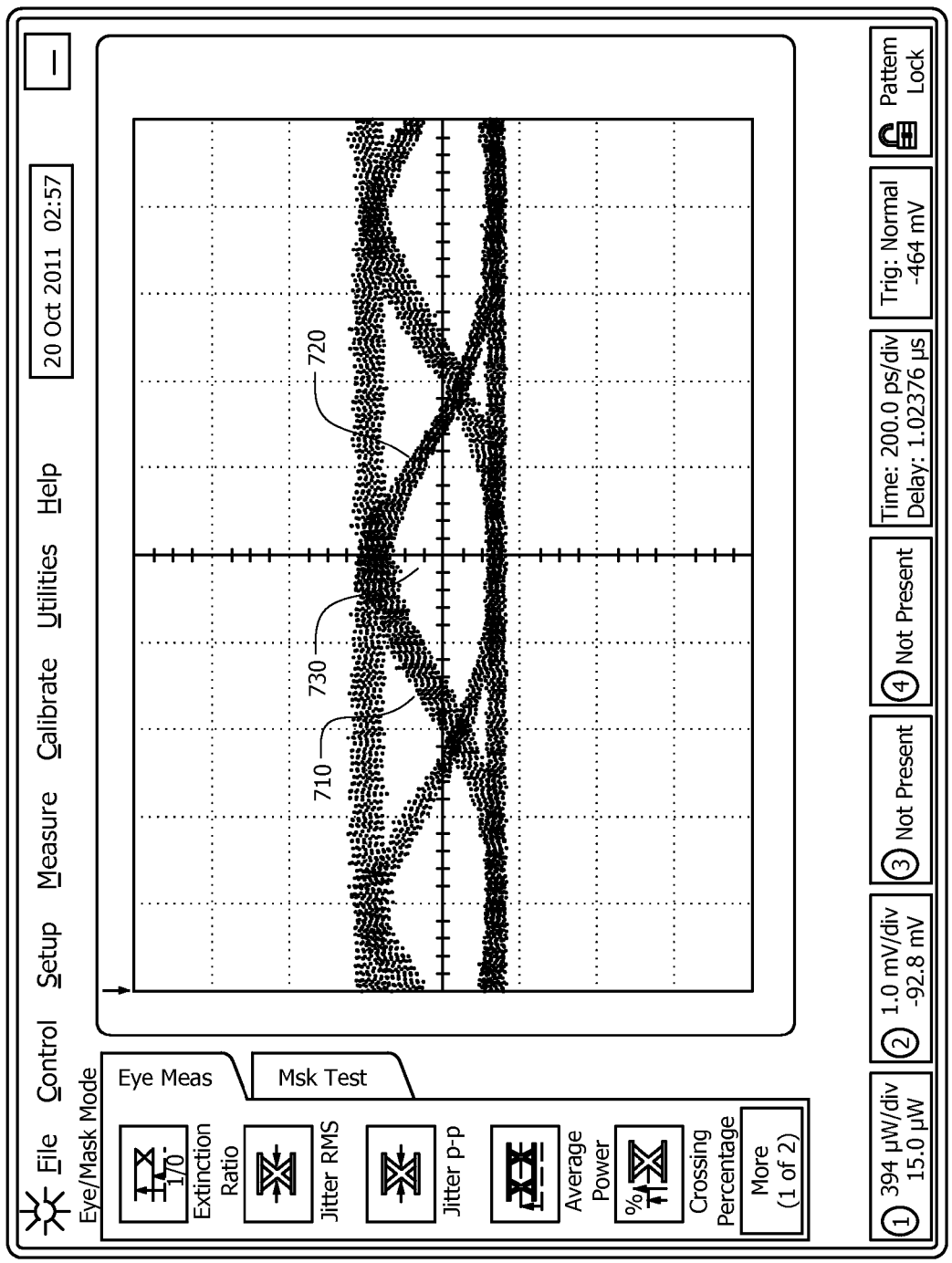
FIG. 7 is another graph of signals observed in a TDM/WDM PON transmitter with a self-seeded RSOA and an IL FP laser.

FIG. 7 is another graph 700 of signals observed in a hybrid TDM/WDM PON transmitter with a self-seeded RSOA and an IL FP laser, for example, the ONU 120. The x-axis may represent time divided into 200-picosecond (ps) divisions, and the y-axis may represent transmission power divided into 394-µW divisions. The graph 700 is also known as an eye diagram. The characteristics of this graph are commonly understood to demonstrate good signal quality. Namely, the graph shows a smooth and quick rise time 710, a smooth and quick fall time 720, and a clearly distinguished eye 730 related to the IL FP light.

Figure 8:
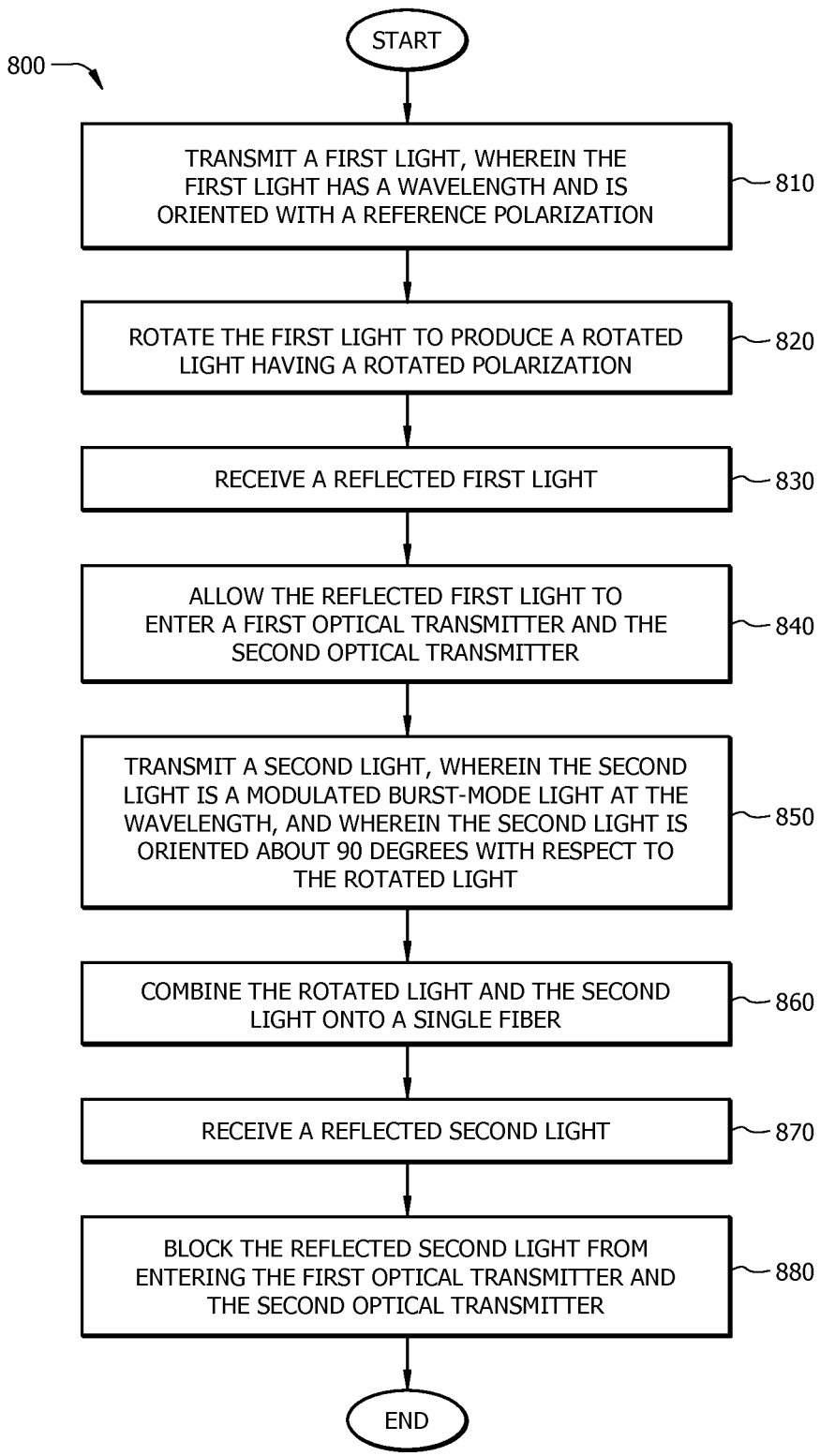
FIG. 8 is a flowchart of a method according to a TDM/WDM PON employing a transmitter.

FIG. 8 is a flowchart of a method according to a TDM/WDM PON employing a transmitter. The method may be implemented in the ONU 120. The method 800 may begin at block 810 where a first light may be transmitted. The first light may have a wavelength and may be oriented with a reference polarization. The optical amplifier 170 may transmit the first light. The first polarizer 210 may orient the first light with a reference polarization. At block 820, the first light may be rotated to produce a rotated light having a rotated polarization. The rotator 220 may rotate the first light. At block 830, a reflected first light may be received. The first light may reflect off the rotator mirror 195 to produce the reflected first light and received by the ONU 120. At block 840, the reflected first light may be allowed to enter a first optical transmitter and the second optical transmitter. The first optical transmitter may be the optical amplifier 170. At block 850, a second light may be transmitted. The second light may be a modulated burst-mode (or continuous mode) light at the wavelength, and the second light may be oriented about 90 degrees with respect to the rotated light. The laser 180 may transmit the second light. At block 860, the rotated light and the second light may be combined onto a single fiber. The rotated light and the second light may first combine in the optical port 270 and then feed into the optical fiber cable 185. At block 870, a reflected second light may be received. The second light may reflect off the rotator mirror 195 to produce the reflected second light and received by the ONU 120. At block 880, the reflected second light may be blocked from entering the first and second optical transmitters. The second polarizer 295 may block the reflected second light from entering the second optical transmitter, and the first polarizer 210 may block the reflected second light. The second optical transmitter may be the laser 180.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
   an optical port;
   a first optical transmitter comprising a self-seeded laser and configured to:
   transmit a first light; and
   receive its own first reflected light associated with the first light;
   a second optical transmitter configured to transmit a second light associated with a second reflected light;
   a partially reflective mirror positioned between the first optical transmitter, the second optical transmitter, and the optical port;

an optical rotator positioned between the partially reflective mirror and the first optical transmitter; and
a first polarizer positioned between the first optical transmitter and the optical rotator and configured to pass the first light and the first reflected light, but not the second light or the second reflected light.

2. The apparatus of claim 1, wherein the first polarizer is configured to pass lights with polarizations of about 0 degrees (°) and about 180°.

3. The apparatus of claim 2, further comprising a second polarizer positioned between the second optical transmitter and the partially reflective mirror.

4. The apparatus of claim 3, wherein the second polarizer is configured to pass lights with polarizations of about 135° and about 315°.

5. The apparatus of claim 4, wherein the optical rotator is configured to rotate lights by about 45°.

6. The apparatus of claim 5, further comprising a coupling lens positioned between the optical port and the partially reflective mirror.

7. The apparatus of claim 6, further comprising a diplexer positioned between the optical port and the coupling lens.

8. The apparatus of claim 1, wherein the second light is a modulated burst-mode light.

9. The apparatus of claim 1, wherein the first optical transmitter is a reflective semiconductor optical amplifier (RSOA) and the second optical transmitter is an injection-locked Fabry-Perot laser.

10. The apparatus of claim 1, wherein the second optical transmitter is a self-seeded reflective semiconductor optical amplifier.

11. The apparatus of claim 1, wherein the first optical transmitter is a reflective semiconductor optical amplifier (RSOA) and the second optical transmitter is an externally seeded reflective semiconductor optical amplifier.

12. The apparatus of claim 1, wherein the first optical transmitter is a Fabry-Perot laser and the second optical transmitter is an externally seeded Fabry-Perot laser.

13. The apparatus of claim 1, wherein the optical port is configured to couple to an optical distribution network (ODN), wherein the first light is an unmodulated light at a wavelength, and wherein the second light is a modulated light at the wavelength.

14. The apparatus of claim 13, wherein the apparatus is part of an optical network unit in a passive optical network.

15. The apparatus of claim 1, wherein the first optical transmitter is configured to transmit the first light to provide a wavelength and a reference polarization, wherein the optical rotator is configured to rotate the first light to produce a rotated light having a rotated polarization, wherein the optical port is configured to receive the first reflected light associated with the rotated light, and wherein the second optical transmitter is configured to transmit the second light at the wavelength by locking onto the reflected first light.

16. An apparatus comprising:
an optical port;
a first optical transmitter;
a second optical transmitter;
a partially reflective mirror positioned between the first optical transmitter, the second optical transmitter, and the optical port; and
an optical rotator positioned between the partially reflective mirror and the first optical transmitter,
wherein the optical port is configured to couple to an optical distribution network (ODN),
wherein the first optical transmitter is configured to provide a first light,
wherein the first optical transmitter is configured to provide an unmodulated light at a wavelength,
wherein the second optical transmitter is configured to provide a modulated light at the wavelength,
wherein the ODN comprises a remote node (RN), and
wherein the RN comprises a second partially reflective mirror and a second optical rotator.

17. An apparatus comprising:
an optical port;
a first optical transmitter;
a second optical transmitter;
a partially reflective mirror positioned between the first optical transmitter, the second optical transmitter, and the optical port; and
an optical rotator positioned between the partially reflective mirror and the first optical transmitter,
wherein the optical port is configured to couple to an optical distribution network (ODN),
wherein the first optical transmitter is configured to provide a first light,
wherein the first optical transmitter is configured to provide an unmodulated light at a wavelength,
wherein the second optical transmitter is configured to provide a modulated light at the wavelength,
wherein the ODN comprises a remote node (RN), and
wherein the RN comprises a splitter and a Faraday rotator mirror.

18. An optical transmitter device comprising:
a first optical transmitter configured to transmit a first light to provide a wavelength and a reference polarization;
an optical rotator configured to rotate the first light to produce a rotated light having a rotated polarization;
a port configured to receive, from a remote node (RN) outside the optical transmitter device, a first reflected light associated with the rotated light;
a second optical transmitter configured to transmit a second light at the wavelength by locking onto the first reflected light, wherein the second light is a modulated burst or continuous mode light, is oriented about 90 degrees (°) with respect to the rotated light, and is associated with a second reflected light;
a fiber or waveguide configured to carry the rotated light and the second light; and
a first polarizer positioned between the first optical transmitter and the optical rotator and configured to pass the first light and the first reflected light, but not the second light or the second reflected light.

19. The optical transmitter device of claim 18, further comprising:
a partially reflective mirror positioned between the fiber or waveguide, the optical rotator, and the second optical transmitter; and
a second polarizer positioned between the second optical transmitter and the partially reflective mirror.

20. The optical transmitter device of claim 19, wherein the first polarizer is configured to pass lights with polarizations of about 0° and about 180°, and wherein the second polarizer is configured to pass lights with polarizations of about 135° and about 315°.

21. The optical transmitter device of claim 18, wherein the first optical transmitter comprises a self-seeded laser and is further configured to receive the first reflected light.

22. A method comprising:
transmitting, by a first optical transmitter, a first light to provide a wavelength and a reference polarization;
rotating the first light to produce a rotated light having a rotated polarization;

receiving, by the first optical transmitter, a reflected first light associated with the rotated light, wherein the reflected first light provides a self-seeding light;

transmitting, by a second optical transmitter, a second light at the wavelength by locking onto the reflected first light, wherein the second light is a modulated burst-mode light, has a substantially small extinction ratio such that any reflections of the second light do not return to the second optical transmitter, and is oriented about 90 degrees (°) with respect to the rotated light; and combining the rotated light and the second light onto a single fiber.

23. A method comprising:

transmitting, using a first optical transmitter, a first light to provide a wavelength and a reference polarization;

rotating the first light to produce a rotated light having a rotated polarization;

receiving a reflected first light associated with the rotated light, wherein the reflected first light provides a self-seeding light;

transmitting, using a second optical transmitter, a second light at the wavelength by locking onto the reflected first light, wherein the second light is a modulated burst-mode light, is oriented about 90 degrees (°) with respect to the rotated light, and has a substantially small extinction ratio such that any reflections of the second light do not return to the second optical transmitter;

combining the rotated light and the second light onto a single fiber;

allowing the reflected first light to enter the first optical transmitter;

allowing the reflected first light to enter the second optical transmitter;

receiving a reflected second light;

blocking the reflected second light from entering the first optical transmitter; and blocking the reflected second light from entering the second optical transmitter.

* * * * *